Patented Mar. 30, 1943

2,315,024

UNITED STATES PATENT OFFICE 2,315,024

CONVERSION OF HYDROCARBONS

John F. Sturgeon, Chicago, Ill., assignor to Universal Oil Products Company, Chicago, Ill., a corporation of Delaware No Drawing. Original application September 8, 1939, Serial No. 293,922. Divided and this application April 29, 1940, Serial No. 332,281

10 Claims. (Cl. 196—52)

This invention relates to the catalytic cracking of hydrocarbon oils and is a division of my co-pending application Serial No. 293,922, filed September 8, 1939, now U. S. Patent 2,278,746, which relates particularly to the manufacture of catalysts suitable for accelerating hydrocarbon conversion reactions.

More specifically it has reference to a process for using granular refractory catalytic materials which are particularly effective in selectively promoting the formation of gasoline boiling range liquids from relatively heavy hydrocarbon fractions.

The art of cracking relatively heavy hydrocarbons to produce primarily gasoline or gas is very extensive and it is recognized that most of the basic principles of hydrocarbon decomposition are known and that particular commercial processes have been developed which embody these principles. The application of catalysts, however, in cracking reactions is practically upon the same basis as it is in other fields, that is, the knowledge of what catalysts to employ when cracking different fractions from different petroleums is largely empirical and admits of no generalizations. A large number of the catalysts developed for cracking have a tendency to accelerate reactions leading to the formation of gas rather than of gasoline, this being particularly evidenced by reduced metal catalysts such as nickel or iron and many of such catalysts are sensitive to sulfur poisoning and are quickly coated with carbonaceous materials which render them practically inert. This deposition of carbonaceous materials is many times related to the type of decomposition reactions selectively fostered by the catalyst and in general it may be said that very few, if any catalysts which have been tried thus far in cracking reactions have reached a commercial status.

The present invention is concerned with the use of catalytic materials which are especially adapted to accelerate the cracking of heavy petroleum fractions and other hydrocarbon materials to increase the rate of production of fractions boiling within the gasoline range. The preferred catalysts are characterized by selectivity in accelerating gasoline forming reactions rather than the gas forming reaction, by their refractive character which enables them to retain their catalytic properties under severe temperature conditions, as well as by their ease and simplicity of manufacture, and their exact reproducibility.

In one specific embodiment the present invention comprises a process for the use of catalysts suitable for use in hydrocarbon conversion reactions using a series of interrelated preparative steps comprising compositing a major proportion of precipitated silica hydrogel with a relatively minor proportion of a material selected from the group of precipitated hydrogels consisting of those of alumina, zirconia, and a mixture of alumina and zirconia; filtering from mechanically removable water; freezing and then thawing the hydrogel composite to destroy its gelatinous structure; filtering and washing to remove water soluble impurities; drying, forming into particles and calcining to produce an active catalyst.

The invention comprises the use of a hydrogel of the material used in the manufacture of the catalyst by any known means, such as the deposition in or upon a suspended silica hydrogel of an alumina hydrogel from a solution of an aluminum salt by means of precipitation with a base, such as ammonium hydroxide, ammonium carbonate, ammonium sulfide or their equivalents. Similarly, a mixture of hydrogels of silica and alumina may be formed by co-precipitation or by separate precipitation followed by compositing with or without the addition of other catalytic materials before, during, or after the precipitation of the hydrogel composite.

Such a hydrogel composite as of silica and alumina is separated by decantation or filtration from the readily removable water and the hydrogel is then frozen. The exact conditions for the freezing operation, such as temperature and rate of freezing, are dependent upon the gel composite in question, its water content, and other factors. Freezing of the gel brings about a loss of the gel structure so that upon thawing the frozen material breaks down into a fine powder or granular material which may be separated readily from the aqueous solution, which prior to freezing frequently makes up the major proportion of the weight of the hydrogel. The solid material obtained from thawing the hydrogel may then be washed with water or by aqueous solutions of hydrogen chloride and/or ammonium chloride, ammonium carbonate, etc. The powdered material may be ground further and formed into particles by suitable methods with or without the addition of promoters prior to the pelleting or particle forming operation. The pelleted or otherwise formed catalyst is then calcined at a temperature in the approximate range of 1000–1500° F. to convert it into a more active form.

The process of freezing a precipitated hydrogel composite is applicable particularly to the preparation of silica-alumina and/or zirconia cracking catalysts as described, but may be used also in the preparation of any other catalyst which may be produced in the form of a precipitated hydrogel requiring washing to free it from water soluble impurities. Thus the process may be applied to any type of catalytic material which exists as a hydrogel during one phase of its manufacture and requires repeated washes with water and aqueous solutions to remove deleterious impurities.

The advantage of utilizing freezing of hydrogel composites during the preparation of catalysts therefrom are that the frozen and thawed catalytic composites may be washed free of alkali metal compounds more easily than is possible when operating with the original hydrogels. Frequently grinding of the composite is unnecessary before forming into catalyst particles and several other drying, grinding, and screening operations are avoided which must be made when the removal of impurities from the precipitated hydrogel catalyst is effected mainly by washing. Thus when grinding of the catalyst is unnecessary there is less danger of contaminating it with ferrous metals. Also, the apparent density of the catalyst prepared from the frozen hydrogel composite is less than that of similar catalysts prepared from a silica-alumina composite which has been merely washed to remove impurities. Further, the peripheral crushing strength of a catalyst formed according to this invention is greater than that of similar catalysts prepared without freezing.

In the finished catalyst the weight ratio of silica to alumina may vary within a considerable range, for example, from 30:1 to 0.1:1, although as a rule catalyst composites having optimum activity based on yields and quality of gasoline and the amounts of readily polymerizable, normally gaseous olefins produced will correspond to silica-alumina weight ratios of the order of about 30:1 to 10:1. These proportions will vary considerably with the particular hydrocarbon fractions subjected to catalytic cracking and the degree of conversion effected in any particular case. It is to be recognized that very little is known positively concerning the mechanism of enhanced activity in complex catalysts and no attempt will be made herein to offer any definite reason for the observed mutually promotional effect of silica and alumina composites prepared for hydrocarbon conversion purposes according to the present invention.

In manufacturing the preferred catalysts in accordance with the present process it is necessary to employ silica which has been prepared by precipitation from solution as a hydrogel within and/or upon which alumina, zirconia, or a mixture of alumina and zirconia is deposited also by precipitation as a hydrogel. A convenient method of preparing a satisfactory silica gel is to acidify an aqueous solution of sodium silicate by the addition of the required amount of hydrochloric acid. The excess of acid and the concentration of the solution in which the precipitation is brought about will determine the eventual primary activity of the silica and its suitability for compositing with alumina, zirconia, or a mixture of alumina and zirconia to produce a catalyst of increased high activity. In general the most active silica is produced by adding only enough acid to cause gel formation to occur in the sodium silicate but the material formed at such a point is gelatinous and is coagulated incompletely. By adding a moderate excess of acid after the gel has formed the more desirable physical characteristics, in regard to catalyst activity, are conserved and the silica hydrogel is precipitated more completely. Fairly good hydrated silica for present catalytic conversion purposes may be made by employing as high as 20% excess hydrochloric acid, but beyond this point a part of the more desirable properties are lost.

Following precipitation, the mixture is filtered to remove readily separable water leaving the silica hydrogel with approximately 85% water content, after which the gel is frozen.

By the freezing process the gel structure is destroyed with the result that upon thawing there is formed a powdered silica or silica-metal oxide mixture which may be separated by filtration from the water resulting from the breakdown of the gel. The powder may be washed free from water soluble impurities, dried, ground further, if desired, and formed into particles such as pellets, or the powdered material may first be washed, formed into particles, and then dried and calcined to produce the finished catalyst.

After precipitating the silica gel, it is preferably frozen, thawed, and then washed until substantially free from salts. In one mode of preparing the activated silica-alumina composite, the silica hydrogel may be boiled either with a separately precipitated alumina hydrogel, which is added in the wet condition to the silica suspension, or the silica hydrogel may be suspended in and boiled with an aluminum salt solution, such as, for example, an aqueous solution of aluminum chloride. In either case the final precipitate comprising the hydrated silica and a hydrated material selected from the group consisting of alumina, zirconia, and a mixture of alumina and zirconia is frozen, thawed, and finally washed to substantially complete removal of water soluble materials, and dried at about 300° F. to produce a rather powdery material which may be formed into particles. Since in the cracking of heavy oils this material is used at temperatures of the order of 850–1200° F. though usually within the range of 900–1000° F. its water content is further reduced until after a period of service it amounts to less than 5% by weight of the catalyst particles.

The necessary alumina, zirconia, and/or a mixture of alumina and zirconia gel is preferably deposited in or on washed alkali metal free silica gel by adding alkaline precipitants such as ammonium hydroxide, ammonium carbonate, or ammonium sulfide to aqueous solutions of aluminum, zirconium, or a mixture of aluminum and zirconium salts, followed by suitable freezing, thawing, and washing to remove impurities. The alumina, zirconia, and/or mixture of alumina and zirconia may be precipitated from such solutions in which the previously prepared and washed hydrated silica is suspended, following by a freezing, thawing, and washing of the total composite precipitate. Similarly, purified silica hydrogel may be suspended in a solution of an aluminate, such as sodium aluminate, and alumina hydrogel may be precipitated by the addition of an aluminum salt of a mineral acid, or by the requisite quantity of the acid itself.

As a further alternative method of producing the desired catalysts, an aluminum or zirconium salt, or a mixture of aluminum and zirconium salts may be added to a solution of an alkali metal silicate to jointly precipitate alumina and zirconia and further amounts of silica may then be precipitated by the addition of acid. A characteristic equation involved is given below, although in it no account is taken of water of hydration:

$$3Na_2SiO_3 + 2AlCl_3 \rightarrow 6NaCl + Al_2O_3 + 3SiO_2$$

It will be obvious that the employment of the reactions shown in the above equation will be limited on account of the molal proportions involved so that such a method of preparation of a composite may need supplementing by the presence of acid for further precipitation of alumina or silica to obtain the desired ratio.

It should be emphasized in the present connection that the catalysts which characterize the process of the invention are essentially composites of substantially pure amorphous silica, zirconia, and alumina. Experiments have indicated definitely that distinctly inferior catalytic materials are obtained when either the silica, alumina or zirconia in the composites has any crystalline characteristics. That is, it is not sufficient to precipitate alumina and/or zirconia gel on such naturally siliceous materials as powdered quartz or diatomaceous earth, however finely divided these materials may be. Similarly, inferior catalysts are obtained if any known form of crystalline alumina is mixed with a carefully prepared and washed amorphous silica. Silica of some value has been obtained by the hydrolysis of silicon tetrachloride, although that similarly obtained from silicon tetrafluoride was decidedly inferior.

In the preparation of active silica hydrogels from soluble silicates, a series of experiments has further indicated that hydrochloric acid is the best common material to use as a precipitant although sulfuric acid and other acids give but slightly inferior results. The precipitation is best conducted at approximately normal temperature since tests made at a temperature of the order of 200° F. gave a silica gel which was inferior as a component of a silica-alumina composite as measured by the gasoline produced when it was used as a cracking catalyst.

If alkali metal salts are present in sufficient quantities in either the originally precipitated silica gel or in the final catalyst composites, catalysts are obtained which are not sufficiently active under the usual cracking conditions. If present in smaller quantities, catalysts may be obtained which are active in the early stages of use but lose their activity during the elevated temperatures reached in reactivation. Catalysts which contain still less alkali metal compounds may be heated up to 1500 to 1600° F. during reactivation without loss of activity. For these reasons special washes are preferably used which are capable of removing these alkali metal compounds from the previously frozen and thawed hydrogel composite so that only minute amounts remain in the finished catalysts, since it has been found that alkali metal compounds could not be removed entirely by washing alone. The washes developed are dilute hydrochloric acid, ammonium chloride, and aluminum chloride solutions. These washes serve to displace the alkali metal compounds in the catalyst so that additional water washing can remove the alkali ions. For economic reasons hydrochloric acid and/or aluminum chloride seem to be both preferable to ammonium chloride, although ammonium chloride seems to be also slightly inferior in its effectiveness.

Cracking catalysts prepared by the general procedure described in the preceding paragraphs are utilized to advantage as reactor filling materials in the form of small pellets or granules. In the majority of cases wherein hydrocarbon fractions readily vaporizable at moderate temperatures without excessive decomposition are employed, the average particle size is within the range of 6–10 mesh, which may apply either to small pellets of uniform size and short cylindrical shape or to particles of regular size and shape produced by the grinding and sizing of the partially dehydrated materials. While the simple method of preheating a given fraction of hydrocarbon oil vapors to a temperature suitable for their cracking in contact with the catalysts and then passing the vapors over a stationary mass of catalyst particles contained in a cylindrical chamber (preferably vertical) may be employed in some cases, it is usually preferable to pass preheated vapors through banks of relatively small diameter catalyst-containing tubes in multiple connection between headers, since this arrangement of apparatus is well adapted to admit exterior heating of the tubes to compensate for the heat loss in the endothermic cracking reaction.

The cracking catalysts may also be utilized in the form of powder, which is mixed with the oil and passed through reactors under conditions of temperature, pressure, and time adequate to give substantial yields of gasoline.

After the passage of the oil vapors over the catalyst, the products may be separated into heavy residual materials unsuitable for further cracking on account of their coke forming tendencies, intermediate insufficiently converted fractions amenable to further catalytic cracking, gasoline boiling range materials, and fixed gases. The intermediate fractions may be returned directly to admixture with the charging stock so that ultimately there is a complete recycling of the unconverted fractions and maximum utilization of cracking stock for gasoline production.

The following example is submitted to show a specific instance of the preparation of the present type of catalyst and the results obtained when using this catalyst in a cracking process, although the data submitted are not intended to limit correspondingly the generally broad scope of the invention:

A co-precipitated hydrogel composite consisting of approximately 85% water and 15% by weight of silica and alumina composited in the proportions of 100 mols of silica and 10 mols of alumina was kept at —15° F. for 12 hours. The material was then thawed, filtered to remove the water freed by the breakdown of the gel, washed several times on the filter with distilled water, and then dried at 221° F. until its water content reached 18%. The resulting powdered composite of alumina and silica was mixed with 4% by weight of aluminum stearate and formed into 3 x 3 mm. pellets by a pelleting machine. The pellets were then calcined at 1292° F. for two hours and used as a filler in a tube through which Pennsylvania gas oil was passed at 932° F., using a liquid space velocity of 4. After a cracking run of 6-hours' duration the catalyst was reactivated by burning off the carbon in a stream of an oxygen-containing gas and then the reactivated catalyst was used for a second period of 6 hours to crack another portion of the same gas oil.

In the table the results of these cracking runs are compared with similar data obtained on the same gas oil in the presence of silica-alumina mixtures of the same composition prepared by the more usual method of co-precipitating silica-alumina, washing, drying, pelleting, and calcining to produce a finished catalyst without utilizing the freezing step of this invention to break down the gel and thus facilitate subsequent purification by washing.

Table

*Cracking of Pennsylvania gas oil at 932° F. in the presence of silica-alumina catalysts*

| Catalyst prepared | With freezing | | Without freezing | |
|---|---|---|---|---|
| Apparent density | 0.60 | | 0.70 | |
| Number of regeneration | 0 | 1 | 0 | 1 |
| Yield, percent by weight of charge: | | | | |
| Carbon | | 0.46 | | 0.39 |
| Gasoline (400 E. P.) | 27.6 | 25.3 | 27.2 | 28.4 |
| Total gas | 14.9 | 10.4 | 11.2 | 9.5 |
| Propene | | 2.44 | | 2.41 |
| Butene | | 2.54 | | 3.67 |
| Gasoline, | | | | |
| Volume percent | 31.6 | 28.7 | 31.1 | 32.4 |
| Octane number | | 80.0 | | 80.0 |

From the results in the table it is evident that the catalyst prepared by freezing the gel compared favorably in cracking activity for producing gasoline of 80 octane number with that obtained in the presence of a similar catalyst prepared by the longer method involved when not freezing the gel.

The character of the present invention and its novelty and utility can be seen from the preceding specification and numerical data presented, although neither section is intended to unduly limit its generally broad scope.

I claim as my invention:

1. A process for cracking a hydrocarbon oil heavier than gasoline to produce a substantial yield of gasoline therefrom which comprises subjecting said hydrocarbon oil under cracking conditions of temperature and pressure to contact with a catalytic material prepared by forming a hydrogel composite comprising silica hydrogel and a second hydrogel selected from the group consisting of alumina and zirconia, freezing and thawing said hydrogel composite to convert it into a powder and an aqueous solution, filtering to separate a major proportion of said aqueous solution from said powder, washing the powder to remove water soluble impurities, drying and calcining the washed material.

2. A process for cracking a hydrocarbon oil heavier than gasoline to produce a substantial yield of gasoline therefrom which comprises subjecting said hydrocarbon oil at a temperature in the approximate range of 850–1200° F. to contact with a catalytic material prepared by compositing a major proportion of precipitated silica hydrogel with a relatively smaller proportion of another precipitated hydrogel selected from those of alumina, zirconia, and a mixture of alumina and zirconia to form a hydrogel composite, freezing and thawing said hydrogel composite to convert it into a powder and an aqueous solution, filtering to separate a major proportion of said aqueous solution from said powder, washing the powder to remove water soluble impurities, drying and calcining the washed material.

3. A process for cracking a hydrocarbon oil heavier than gasoline to produce a substantial yield of gasoline therefrom which comprises subjecting said hydrocarbon oil at a temperature in the approximate range of 850–1200° F. to contact with a catalytic material prepared by separately precipitating silica hydrogel by acidifying an aqueous solution of an alkali metal silicate, adding to said silica hydrogel a minor proportion of a zirconia hydrogel produced by adding an alkaline precipitant to an aqueous solution of a zirconium salt thereby producing a hydrogel composite, freezing and thawing said hydrogel composite to convert it into a powder and an aqueous solution, filtering to separate a major proportion of said aqueous solution from said powder, washing the powder to remove water soluble impurities, drying and calcining the washed material at a temperature in the approximate range of 1000–1500° F.

4. A process for cracking a hydrocarbon oil heavier than gasoline to produce a substantial yield of gasoline therefrom which comprises subjecting said hydrocarbon oil at a temperature in the approximate range of 850–1200° F. to contact with a catalytic material prepared by separately precipitating silica hydrogel by acidifying an aqueous solution of an alkali metal silicate, adding to said silica hydrogel minor proportions of alumina and zirconia hydrogels produced by adding an alkaline precipitant to a mixture of aqueous solutions of aluminum and zirconium salts thereby producing a hydrogel composite, freezing and thawing said hydrogel composite to convert it into a powder and an aqueous solution, filtering to separate a major proportion of said aqueous solution from said powder, washing the powder to remove water soluble impurities, drying and calcining the washed material at a temperature in the approximate range of 1000–1500° F.

5. A process for cracking a hydrocarbon oil heavier than gasoline to produce a substantial yield of gasoline therefrom which comprises subjecting said hydrocarbon oil at a temperature in the approximate range of 850–1200° F. to contact with a catalytic material prepared by separately precipitating silica hydrogel by acidifying an aqueous solution of an alkali metal silicate, adding said silica hydrogel to a solution containing aluminum and zirconium salts, precipitating the mixture of alumina and zirconia hydrogels upon said silica hydrogel in a total amount corresponding to less than 30% by weight of the finally prepared composite by the addition of a reagent selected from the group consisting of ammonium hydroxide, ammonium carbonate, and ammonium sulfide, freezing and thawing the silica-alumina-zirconia hydrogel composite to convert it into a powder and an aqueous solution, filtering to separate a major proportion of said aqueous solution from said powder, washing the powder to remove water soluble impurities, drying and calcining the washed material at a temperature in the approximate range of 1000–1500° F.

6. The process as defined in claim 1 further characterized in that said second hydrogel comprises alumina.

7. The process as defined in claim 1 further characterized in that said second hydrogel comprises zirconia.

8. A hydrocarbon oil conversion process which comprises contacting the oil under cracking conditions with a catalyst prepared by forming a hydrogel composite comprising silica hydrogel and a second hydrogel selected from the group consisting of alumina and zirconia, freezing and thawing said composite and separating water therefrom, and then washing and drying the composite.

9. The process as defined in claim 8 further characterized in that the catalyst is employed in powdered form in the oil cracking.

10. The process as defined in claim 8 further characterized in that the catalyst is employed in pelleted form in the oil cracking.

JOHN F. STURGEON.